March 13, 1956     P. ALMERAS     2,737,962
SPEED REGULATORS FOR TURBINES
Filed May 19, 1949
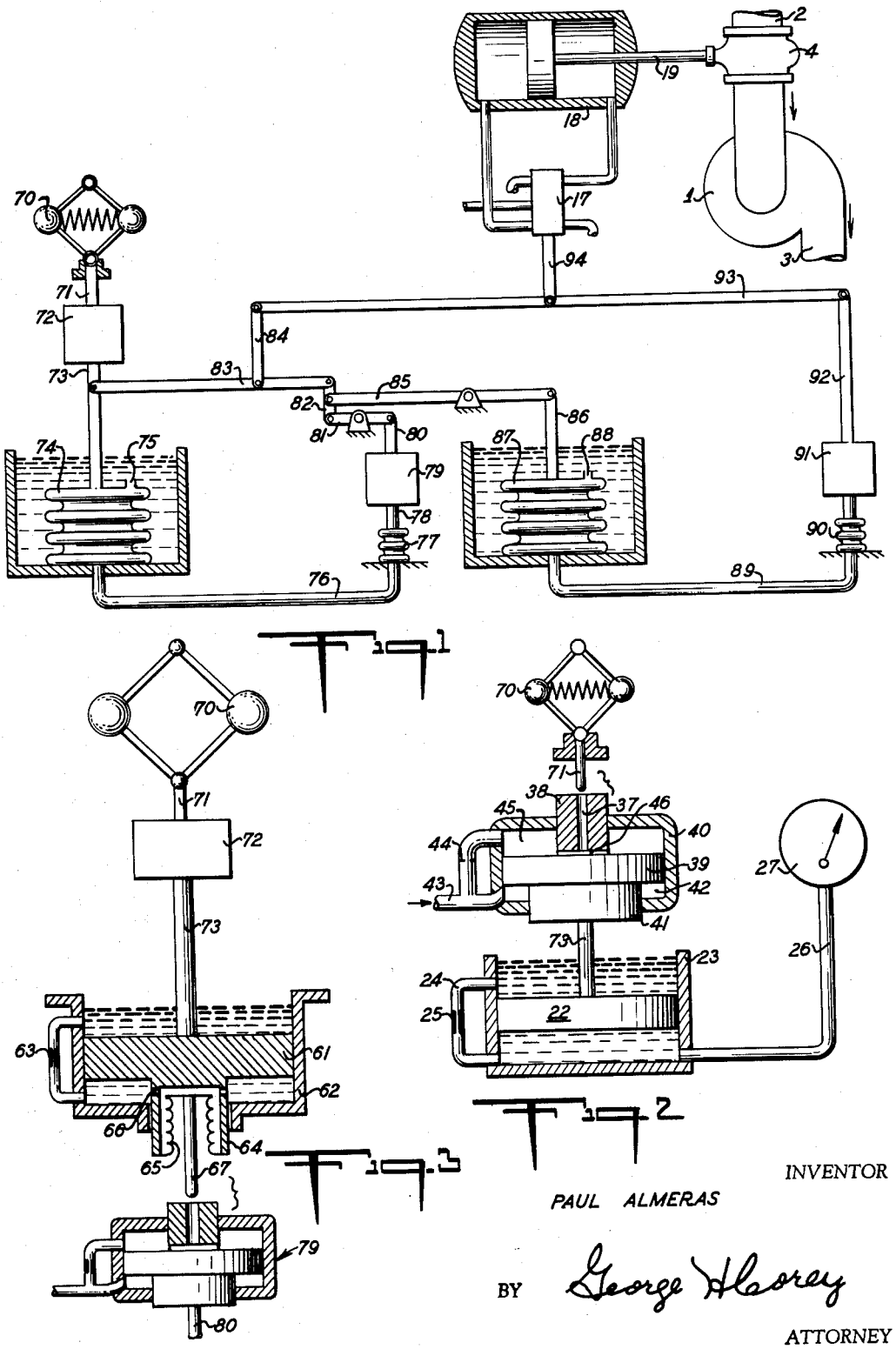
INVENTOR
PAUL ALMERAS
BY George Heorey
ATTORNEY

United States Patent Office 2,737,962
Patented Mar. 13, 1956

2,737,962

SPEED REGULATORS FOR TURBINES

Paul Almeras, Grenoble, France, assignor to Etablissements Neyrpic, Grenoble, France, a corporation of France Application May 19, 1949, Serial No. 94,245

Claims priority, application France May 25, 1948

2 Claims. (Cl. 137—26)

This invention relates to a method and apparatus for regulating the speed of a turbine, particularly a hydraulic turbine.

Turbine regulators commonly control the turbine speed and thereby the frequency of the current produced by an alternator driven by the turbine. This invention will be described herein as applied to such a regulator for controlling the speed of a hydraulic turbine.

Hydraulic turbines equipped with regulators constructed in accordance with the prior art have unstable characteristics, sometimes described as over-regulation or hunting. Such instability is characterized by an oscillation of the turbine speed, first above, then below the selected value which the regulator is intended to maintain. It is known that this instability of hydraulic turbines is caused primarily by the inertia of the water in the intake and discharge conduits.

One example of the initiation of such an unstable oscillating condition is the sequence of events which occurs upon an overspeeding of the turbine as a result of a sudden permanent decrease in load, such as may be produced by an external factor. In a conventional turbine regulating system, the governor responds to such an overspeeding by producing a control effect proportional to the increase in speed. This acts on the distribution valve of a servo-motor, or equivalent mechanism, and thereby causes the gate to close and determines the rate of movement of the gate in a closing direction. It also thereby determines the rate of decrease of the force driving the turbine. Since the driving force is decreasing and the load is no longer decreasing, then the driving force and the load will eventually come into balance again and the turbine speed will be restored to its desired value. However, as the valve moves in a closing direction, it produces a temporary pressure surge upstream from the valve. This pressure surge is due to the inertia of the fluid mass in the turbine system, and it tends to force an additional quantity of water through the valve and thereby at least partially cancels the effect of the valve closing movement. Consequently, the overspeeding of the turbine is not reduced as rapidly as it should be and the governor moves the gate farther towards its closed position than is necessary. Once the pressure surge is dissipated, this unduly restricting position of the gate causes the turbine to slow down below its rated speed and the governor must then act to open the valve again. The opening movement produces a momentary decrease in pressure upstream from the valve which tends to partially cancel the effect of the valve opening movement. The governor therefore opens the valve too far and after the temporary decrease in pressure has disappeared, the governor must act again to close it. This alternate opening and closing action of the governor is the unstable oscillating condition referred to above, and may be prolonged indefinitely.

The inertia of the rotating parts of the turbine has, on the other hand, a stabilizing effect in that it tends to oppose any acceleration or deceleration of the turbine. It should be noted, however, that this opposition is just as effective against a corrective acceleration or deceleration as it is against a disturbing acceleration or deceleration.

Previous hydraulic turbine regulators can in general be classified as (1) Speed responsive regulators compensated for acceleration; and (2) speed responsive regulators having a temporary restoring follow-up. United States patent application Serial No. 7,943, filed February 12, 1948, by Jean Daniel, now Patent No. 2,630,814, issued March 10, 1953, entitled "Stability of Hydraulic Turbine Regulators" illustrates both types of such previous regulators.

Theoretical studies of the stability of hydraulic turbines using such prior regulators have been published in the articles: "Influence of Water Inertia on Hydroelectric System Stability," Houille Blanche, Nos. 1, 2, 3 of 1946, and "Characteristics of Regulators," Houille Blanche No. 6 of 1947, by P. Almeras. These studies discuss the turbine system stability in terms of $t$, the time constant of the rotating mass of the turbine and its load, and $T$, the time constant of the mass of water in the intake and discharge conduits. The time constants $t$ and $T$ are measures of the inertia of the rotating mass and of the fluid mass, respectively.

The time constant $t$ of the rotating mass of the turbine is defined in the studies referred to as the time required for the rotating mass to accelerate from standstill to working speed, with the gates fully open and normal net head. (Net head may be defined as the difference between the heads at the inlet and outlet of the turbine system.) The time constant $T$ of the fluid mass may be similarly defined as the time required for the fluid mass to accelerate from standstill to the mean effective water speed at full gate opening under the normal net head. Note that for a given turbine, having a fixed mass of its rotating parts and fixed dimensions of its water conduits, both of these time constants are fixed.

In this specification, the time constants $t$ and $T$ are referred to as the inertia characteristics of the turbine, and the phrase "an inertia characteristic of the turbine" is intended as a generic term including as species the time constants $t$ and $T$.

In the studies referred to above, it is concluded that in order to stabilize a turbine system provided with one of the prior art regulators and having a small rotating mass time constant $t$ and a large fluid mass time constant $T$, it is necessary to decrease the sensitivity $K_0$ of the regulator. The sensitivity may be measured by the response of the turbine control valve mechanism per unit change in speed. The sensitivity of $K_0$ may also be defined by its inverse $t'$, which is the time required for the regulator to respond to a speed variation of 1% so as to cause a power output variation of 1%. When the sensitivity $K_0$ is too small (or when the $t'$ becomes too great) then the turbine speed is poorly regulated.

An object of the present invention is to increase the sensitivity of a turbine regulating system without decreasing its stability.

The foregoing and other objects of the invention are attained by controlling the flow of fluid through the turbine in accordance with the resutant of three control effects which respectively vary with the turbine speed and with the first and second derivatives of speed with respect to time. The relative influence of the speed control effect and the first derivative control effect is determined by the inertia of the fluid mass in the turbine system. In one embodiment of the invention disclosed herein, the influence of the second derivative control effect is determined by the inertia of the rotating parts of the turbine system. The resultant control effect is applied to the pilot valve of the valve operating mechanism which controls the water flow and thereby the turbine speed.

Through the use of this invention, the sensitivity of a turbine speed regulator may be increased by a factor of 5 or 6, without adversely affecting the stability. Alternatively, the sensitivity may be held fixed and the rotating mass time constant $t$ may be reduced by a factor of 5 or 6, thereby reducing the inertia of the rotating mass required for stability.

The invention will be more particularly described with reference to the accompanying drawings, wherein:

Fig. 1 is a somewhat diagrammatic illustration of a turbine speed regulator embodying the principles of the present invention.

Fig. 2 shows somewhat diagrammatically a relay for actuating a derivative device.

Fig. 3 shows partly diagrammatically two relays actuating and actuated by a derivative device.

Referring now to Fig. 1, there is shown a turbine system including a turbine 1, a water intake conduit 2 and a discharge conduit 3. A control valve, schematically shown at 4, is provided to vary the flow of water through the turbine. A governor or tachometer, indicated at 70, is operatively connected by conventional means (not shown) to the turbine 1 so as to be responsive to the speed of the turbine 1.

Means are shown in Fig. 1 and described hereinafter actuated by the governor 70 that are responsive to the acceleration, or first derivative of speed with respect to time, of the turbine. Means also are shown responsive to the second derivative of the turbine speed with respect to time. These means may be constructed along the lines of several devices disclosed hereinafter. In Fig. 1 the governor 70 moves the left end of a lever 83 as a function of the turbine speed. The first derivative device moves the right end of lever 83 as a function of the acceleration of the turbine. The center of lever 83 is connected by a link 84 to one end of a lever 93. The opposite end of lever 93 is positioned by the second derivative device as a function of the second derivative of the turbine speed with respect to time. The center of lever 93 is connected by a rod 94 to a pilot valve schematically shown at 17 controlling a fluid servomotor 18. The servomotor 18 operates a piston rod 19 which may be connected to the control valve mechanism 4 which controls the supply of water to the turbine 1. In the case of impulse turbines, the valve mechanism 4 may be any of the well-known types of needle nozzles commonly used in such turbines. In reaction type turbines, the valve mechanism 4 may be any suitable form of gate mechanism.

For small changes in the respective variables, the resulting displacements of the ends of lever 83 and of the right end of lever 93 are proportional to such changes. The displacement of rod 94 from its normal central position is the resultant of three displacements, namely, those of the governor 70, the first derivative device and the second derivative responsive device. Hence the displacement of pilot valve 17, and consequently the speed of movement of the servomotor 18 and the gate valve mechanism of the turbine are each the sum of three terms: one proportional to the turbine speed, one to the turbine acceleration, and the third proportional to the second derivative of speed with respect to time.

The unit displacement of rod 94 produced by a unit change in speed acting through the governor 70 may be represented by the coefficient of proportionality $K_0$; the unit displacement of rod 94 in response to a unit acceleration acting through the first derivative device may be represented by the coefficient $K_1$. Similarly, the unit displacement of rod 94 produced by unit variation in the second derivative acting through the second derivative device may be represented by the coefficient $K_2$. These coefficients $K_0$, $K_1$ and $K_2$ determine the speed of response of the gate valve mechanism to changes in the speed and its first and second derivatives, respectively. All these coefficients are negative, since a positive change is speed, or in the first or second derivative produces a closing or speed-reducing movement of the gate valve mechanism. In the following discussion, the ratio $m$ equal to $K_1/K_0$ will be called the acceleration-speed ratio.

It may be seen that the coefficient $K_0$, defined immediately above, corresponds generally to the sensitivity $K_0$, as defined in the preliminary discussion of prior turbine regulators.

Turbine regulating systems of the prior art have used governors and accelerometers to control the gate valve mechanism. The addition of the second derivative responsive device, in accordance with the present invention, considerably improves the stability of such a regulator. This improvement is attained without reducing the sensitivity $K_0$, as would be required to improve the stability if the second derivative responsive device were not present. This improvement is a maximum for the optimum proportioning of the control effects of the three control devices. This optimum proportioning depends upon several variable factors including the time constants $t$ and $T$ which respectively measure the inertia of the rotating mass and of the fluid mass. Allievi's factor $\rho$ and other variable factors depending upon the electrical network to which the generator driven by the turbine is connected. In accordance with the present invention, the coefficient $K_2$ of the second derivative responsive apparatus is taken between $t/3$ and $t$. Furthermore, the acceleration-speed ratio $m$ should be approximately equal to $T$ (between $T/2$ and $2T$). In a specific example, where the electrical load connected to the turbine-driven alternator is purely resistive and the potential is maintained strictly constant, the coefficient $K_2$ should be in the neighborhood of $t/2$.

The displacement of rod 94 represents a particular position of the pilot valve 17 and hence represents the rate of opening of the main valve or gate. As indicated in the Houille Blanche articles mentioned above (Houille Blanche, No. 1, November 1945, page 83, line 4 from the bottom, or the translation appearing in the Engineers' Digest, vol. 8, No. 1, January 1947, page 8, column 2, line 14), the coefficient $K_0$ represents the proportionality between a dimensionless ratio (the ratio between the speed increment and rated speed) and the rate of opening of the main valve. Consequently, the dimensions of $K_0$ are the same as those of the rate of opening of the valve, namely, the inverse of time.

Similarly, $K_1$ represents the proportionality between the first derivative of that dimensionless ratio and the rate of opening of the main valve. However, both this first derivative and the rate of valve opening have the same dimensions (the inverse of time), so that $K_1$ is itself dimensionless.

In the same manner, $K_2$ represents the proportionality between the second derivative of that dimensionless ratio, whose dimensions are the inverse of time squared, and the rate of valve opening, whose dimensions are the inverse of time. Consequently, the dimensions of $K_2$ are those of time. It follows from the foregoing that the dimensions of $m=(K_1/K_0)$ are also those of time.

It is therefore proper to substitute for $K_2$ and for $m$ values derived from $t$ and $T$, which also have the dimensions of time.

Before further describing the apparatus of Fig. 1 and its operation, relay means shown diagrammatically in Fig. 1 cooperating with the derivating devices will be described briefly in connection with Figs. 2 and 3.

Fig. 2 illustrates a form of apparatus in which a continuous flow type of fluid relay is connected between the governor 70 and the dashpot piston 22.

In this arrangement, the governor 70 operates a rod 71 whose lower end obturates the end of a passage 37 in a rod 38 movable vertically in the top wall of a cylinder 40. Rod 38 is attached to piston 39 moving in cylinder 40. The lower end of piston 39 is connected by a rod 41 and its extension 73 to the dashpot piston 22, the rod 41 being movable vertically in the bottom wall of cylinder 40. A chamber 42 formed in cylinder 40 under piston 39 is connected by means of a conduit 43 to a suitable source of fluid under pressure. Fluid also flows from this source through a restricted orifice 44 to a chamber 45 formed above the piston 39 inside the cylinder 40. The chamber 45 is connected through a suitable passage 46 to the passage 37 in rod 38.

The end of rod 41 which is attached to piston 39 is of greater diameter than the rod 38. Consequently the area of piston 39 subject to pressure in chamber 42 is smaller than the area of piston 39 subject to the pressure in chamber 45. The pressure in chamber 42 under the piston 39 is always the fluid inlet pressure. Fluid is continuously flowing through the orifice 44 to chamber 45 and thence through passages 46 and 37 to the exterior of cylinder 40. Because of the pressure drop across orifice 44, the pressure in chamber 45 is lower than the inlet pressure. When the pressure in chamber 45 has a value such that the downward force produced by it on the larger upper surface of piston 39 balances the upward force produced by the inlet pressure in chamber 42 acting on the smaller lower surface of piston 39, then the piston 39 remains stationary.

The lower end of rod 71 cooperates with the end of passage 37 to form a variable restriction. The pressure in chamber 45 has some value between the inlet pressure in conduit 43 and the external outlet pressure. This pressure in chamber 45 is determined by the relative sizes of orifice 44 and of the restriction formed by rod 71 in passage 37. When the position of rod 36, as determined by governor 70 is just sufficient to maintain the pressure in chamber 45 at that value which holds piston 39 stationary, then the system is in equilibrium. If then the rod 71 is moved by the governor, for example, in an upward direction, the restriction at the end of passage 37 is enlarged and more fluid flows out, thereby decreasing the pressure in chamber 45 so that piston 39 is moved upwardly by the unbalance between the pressures acting on it, until the pressure balance is restored. In a similar manner, if the rod 71 moves downwardly to increasingly restrict the passage 37, then the pressure in chamber 45 increases and moves the piston 39 downwardly until the pressure equilibrium on the piston 39 is restored. It will be readily understood that the power required to move the dashpot piston 22 is supplied by the fluid under pressure supplied to the relay mechanism from the source 43. The only force which is required of the governor is that necessary to move the rod 71.

If required, the relay mechanism between the governor 70 and dashpot piston 22 may be arranged to amplify or reduce the travel of the dashpot piston with respect to the travel of the governor.

In Fig. 3 there is shown another type of apparatus for adding together the control effects of a variable quantity and its derivative. As there shown, the variable quantity is speed, measured by a governor 70 which operates a rod 71 acting through a suitable relay 72 to position a rod 73 attached to a piston 61 moving in a cylinder 62. The ends of cylinder 62 are connected through a suitable orifice 63. The lower surface of piston 61 is provided with a downwardly projecting sleeve 64 whose lower end is closed by a flexible bellows 65. The interior of sleeve 64 is connected through suitable apertures 66 to the chamber formed between the piston 61 and the lower end of cylinder 62. Variations of pressure in that chamber measure the acceleration of the machine which drives the governor 70. The apertures 66 are large enough as compared to orifice 63 so that the pressure within sleeve 64 varies concurrently with the pressure under piston 61. Hence, the bellows 65 measures that pressure and positions a rod 67 in accordance with the pressure variations. It may be seen that the position of rod 67 depends both on the position of piston 61 and upon the expanded or contracted condition of the bellows 65. Hence the position of rod 67 is a measure of the resultant of speed and acceleration. The position of rod 67 is transmitted through a suitable relay mechanism generally indicated at 79. The relays 72 and 79 correspond generally to that described in detail in connection with Fig. 2. This relay mechanism 79 positions a rod 80 which may be utilized to perform any desired operation, for example, the actuation of a second derivative device as about to be described.

Fig. 1 further illustrates, somewhat diagrammatically, a mechanism for combining a displacement due to speed with displacements due to the first and second derivatives of speed. This mechanism may be used in accordance with the present invention to control the valve mechanism and thereby the speed of the turbine. In Fig. 1 the governor 70 operates a rod 71, which acts through a relay schematically shown at 72 to position a rod 73 attached to the upper end of a bellows 74. Bellows 74 is provided with an orifice 75, so that it acts as a dashpot and the pressure within it varies in accordance with the rate of change of position of rod 73.

This pressure within the bellows 74 is transmitted through a conduit 76 to a bellows 77, whose free end acts through a rod 78, a relay 79, a rod 80, and a lever 81 to position rod 82. The position of rod 82 is therefore a measure of the acceleration of the device which drives the governor 70.

The lever 83 above mentioned is connected at one end to the rod 73, whose position is a measure of the turbine speed, and its right end to the rod 82, whose position is a measure of the turbine acceleration. The link 84 is connected to a central point on the lever 83. Hence the position of link 84 is a measure of the resultant of the turbine speed and acceleration.

Another lever 85 is connected at one end to rod 82 and at its opposite end to a rod 86 whose lower end is attached to a bellows 87 provided with an orifice 88. The bellows 87 acts as a dashpot, and the pressure within it varies in accordance with the derivative with respect to time of the position of rod 86. Since rod 86 is positioned by rod 82 in accordance with the first derivative of turbine speed, it may be seen that the pressure inside bellows 87 is a measure of the second derivative with respect to time of the turbine speed. This pressure is transmitted through a conduit 89 to a bellows 90, which acts through a relay 91 and a rod 92 to position the right end of the lever 93. The left end of lever 93 is positioned by link 84. It will be remembered that the position of link 84 is a measure of the resultant of speed and its first derivative. A rod 94 is connected to a central point on the lever 93. It may be seen that the position of rod 94 is a measure of the resultant of the speed and its first and second derivatives with respect to time. This rod 94 as above mentioned is connected through the operating mechanism 17, 18, 19 to the control valve 4 of the turbine.

The relays 72, 79, 91 shown diagrammatically in Fig. 1 may be constructed as described in connection with relays 40 and 79 of Figs. 2 and 3. It will be understood that the arrangement of Fig. 3 utilizing the derivative device comprising cylinder 62, piston 61, orifices 63, 66 and bellows 65 may be substituted for the devices comprising bellows 74, 87 in Fig. 1 in cooperation with relays 72, 79, 91. It will be understood further that pressure gauges as shown at 27 in Fig. 2 may be connected to conduits 76 and 89, Fig. 1, to show the respective pressures developed by bellows 74, 87.

The ratios between the control effects of speed and its two derivatives may be varied either by modifying the various relays, by varying the lever arms or by controlling the sizes of the orifices in the various dashpots, or by any other suitable means.

In the preliminary part of this specification, there is described one example of the initiation of a hunting or oscillating condition in a turbine equipped with a conventional regulator. There will now be described a similar sequence of events in a turbine equipped with regulating apparatus constructed in accordance with the present invention.

It is assumed that the turbine is running at its rated speed and that a sudden and permanent decrease in load from some external cause produces an acceleration of the turbine. This in turn produces three control effects, one varying with the speed, one varying with the acceleration and one varying with the second derivative of the turbine speed. At first, all three of these control effects act in a sense to move the turbine valve in a closing direction. The valve therefore starts to close at a rate determined by the resultant of these three control effects. The rate of movement of the valve determines the rate of change of the driving force and hence the rate of change of the acceleration, if it is assumed that the disturbance in the load which caused the original acceleration has disappeared.

As before, the valve closing movement causes a pressure surge upstream from the valve, due to the inertia of the water in the turbine system, and tending to cancel the effect of the valve closing movement. However, the pressure surge effect is to some extent anticipated by the additional control effects, so the valve is closed more rapidly than in the previous case, the increased rapidity of movement tending to counteract the pressure surge effect.

As the valve starts to move toward closed position, the turbine driving force decreases and hence the acceleration decreases also. The acceleration reaches its peak value in the very short interval required for the control apparatus to respond to the increased speed. The rate of acceleration, or the second derivative of speed, reaches its peak during the time the acceleration is increasing. By the time the acceleration reaches its peak, the second derivative of speed has dropped to zero, and thereafter becomes negative. When the rate of acceleration becomes negative, the component control effect due to the second derivative of speed begins to oppose the two components due to speed and acceleration. The valve continues to move more rapidly than in a system controlled by speed alone, due to the effect of the acceleration component, but the valve closing movement is slowed somewhat from its original high speed.

As the valve continues to close, the driving force acting on the turbine decreases and the acceleration of the turbine decreases with it, finally becoming zero and reversing (i. e., becoming a deceleration) so as to restore the turbine to its rated speed. When the acceleration becomes zero and reverses, the speed reaches its maximum value and thereafter decreases. During this decelerating phase, the driving force is actually less than that required to drive the turbine at its rated speed. The acceleration control effect and the second derivative control effect are then both acting in opposition to the velocity control effect and slowing the rate of closing movement of the valve. The velocity control effect is decreasing and eventually is balanced by the other two components while the turbine is still above its rated speed. The main valve is stationary when the components are balanced. As the components approach a condition of balance, the acceleration approaches a negative peak and the second derivative approaches zero. The driving force is still less than that required to drive the turbine at its rated speed, and the speed is still somewhat above rated. The turbine therefore continues to decelerate, but at a lower absolute value of deceleration. The second derivative of speed therefore becomes positive again, aiding the velocity component, but these two are overcome by the acceleration component and the main valve now moves in an opening direction. The deceleration is further decreased and the speed approaches its rated value asymptotically. When the rated speed is reached, the main valve is again stationary, all three control effects are zero and the governor does not overshoot. No hunting action is set up.

In order that all three effects may reach zero at the same time, as described above, the three effects must be proportioned to one another in accordance with the inertia characteristics of the turbine system, in the manner set forth in detail above. If this is done, the unstable operation of the turbine will be prevented, and the turbine will be restored to its rated speed more rapidly than in the regulating systems of the prior art.

In the turbine regulators described in this specification, all of the accessory control devices commonly found in such regulators have been omitted for the sake of simplicity. Such accessory control devices compensate for variable factors other than speed, including the turbine load, the static head of water or other fluid available to drive the turbine, etc.

I claim:

1. In a system for controlling the speed of a machine, the combination with a control device having a movable control member and operatively connected to the machine for controlling the speed of the machine upon movement of said control member, of a mechanism having a plurality of transmission members articulated to provide for movement of any of three different points thereof relative to each of the other two points concomitantly with movement of said articulated members without requiring movement of either of said other two points, said mechanism being operatively connected to said movable control member and being operable to effect speed controlling movement of said control member upon movement of any of said three points of said mechanism, a movable element operatively connected to said machine and constructed and arranged so as to be moved in response to variations in the speed of said machine, a second movable element operatively connected to and actuated by said first movable element and constructed and arranged so as to be moved in response to the acceleration of said machine, and a third movable element operatively connected to and actuated by said second movable element and constructed and arranged so as to be moved in response to the rate of change of the acceleration of said machine, said three elements being connected to said mechanism respectively at said three points so as to effect movements of said movable control members respectively in response to the speed, the acceleration and the rate of change of acceleration upon said movements respectively of said first, second and third movable elements, said mechanism transmitting said movements of said elements to said control member so as to restore the speed upon departure of the speed from a predetermined speed.

2. In a system for controlling the speed of a machine, the combination as defined in claim 1 in which said mechanism comprises a lever connected at two points spaced therealong respectively to said element responsive to the speed and to said element responsive to acceleration, a second lever, a connection from a given point on said second lever to said first lever at a point on said first lever spaced therealong from both of said two spaced points of said first lever, said second lever being connected to said element responsive to rate of change of acceleration at another point on said second lever spaced therealong from said given point, and a connection to said movable control member from a point on said second lever spaced both from said given point and from said other point of said second lever for transmitting said movements of said elements to said control member.

(References on following page)

References Cited in the file of this patent

UNITED STATES PATENTS

| | | |
|---|---|---|
| 1,102,731 | Englesson | July 7, 1914 |
| 1,600,542 | Gagg | Sept. 21, 1926 |
| 1,777,458 | Allen | Oct. 7, 1930 |
| 1,962,676 | Albright | June 12, 1934 |
| 2,015,861 | Mitereff | Oct. 1, 1935 |
| 2,020,847 | Mitereff | Nov. 12, 1935 |

FOREIGN PATENTS

| | | |
|---|---|---|
| 536,537 | Great Britain | May 19, 1941 |
| 568,634 | Great Britain | Apr. 13, 1945 |